US011255408B2

(12) United States Patent
Ahnert et al.

(10) Patent No.: US 11,255,408 B2
(45) Date of Patent: Feb. 22, 2022

(54) CLUTCH DISK COMPRISING A PENDULAR ROCKING DAMPER HAVING ONLY ONE DIRECTION OF MOVEMENT BETWEEN THE FLANGE REGIONS THEREOF, AND FRICTION CLUTCH

(71) Applicant: Schaeffler Technologies AG & Co. KG, Herzogenaurach (DE)

(72) Inventors: Gerd Ahnert, Sasbach (DE); Maria Fischer, Lauf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/041,742

(22) PCT Filed: Mar. 7, 2019

(86) PCT No.: PCT/DE2019/100205
§ 371 (c)(1),
(2) Date: Sep. 25, 2020

(87) PCT Pub. No.: WO2019/192643
PCT Pub. Date: Oct. 10, 2019

(65) Prior Publication Data
US 2021/0115982 A1  Apr. 22, 2021

(30) Foreign Application Priority Data
Apr. 6, 2018 (DE) .......................... 102018108142.1

(51) Int. Cl.
*F16D 13/68* (2006.01)
*F16F 15/121* (2006.01)

(52) U.S. Cl.
CPC ............ *F16F 15/121* (2013.01); *F16D 13/68* (2013.01); *F16D 2300/22* (2013.01)

(58) Field of Classification Search
CPC ...... F16D 13/68; F16D 2300/22; F16F 15/12; F16F 15/121; F16F 15/1205;
(Continued)

(56) References Cited

U.S. PATENT DOCUMENTS

| 4,698,045 A | * | 10/1987 | Billet | ................... | F16F 15/1202 |
| | | | | | 192/105 BA |
| 2011/0177869 A1 | * | 7/2011 | Yoshimura | ............ | F16F 15/123 |
| | | | | | 464/61.1 |
| 2016/0337160 A1 | | 11/2016 | Sano et al. | | |

FOREIGN PATENT DOCUMENTS

| CN | 102792056 A | 11/2012 |
| CN | 103228946 A | 7/2013 |

(Continued)

*Primary Examiner* — Ernesto A Suarez
*Assistant Examiner* — Lori Wu
(74) *Attorney, Agent, or Firm* — Kevin Parks

(57) ABSTRACT

A clutch disc includes an input part, an output part, and a vibration damper. The vibration damper includes a first part with a first flange area, a second part with a second flange area, a spring device, and first and second intermediate parts. The intermediate parts are coupled to the first flange area and the second flange area by respective slide devices such that movement of the intermediate parts relative one another is inhibited by the spring device. The flange areas are each in operative connection with the input part and the output part such that a load acting on the input part that changes from either rotational direction to an opposite rotational direction moves the first flange area relative to the second flange area in a single fixed direction of movement.

10 Claims, 4 Drawing Sheets

(58) Field of Classification Search
CPC ............... F16F 15/1216; F16F 15/1217; F16F 15/12346; F16F 15/1236; F16F 15/12373; F16F 2230/0064
See application file for complete search history.

(56) References Cited

FOREIGN PATENT DOCUMENTS

| | | | | |
|---|---|---|---|---|
| CN | 103238008 | A | 8/2013 | |
| CN | 105324589 | A | 2/2016 | |
| DE | 102014210685 | A1 | 12/2014 | |
| DE | 102015211899 | A1 | 12/2016 | |
| DE | 102018108441 | A1 | 10/2019 | |
| GB | 1008106 | A | 10/1965 | |
| JP | S58113636 | A | 7/1983 | |
| JP | S6117722 | * | 1/1986 | ............. F16D 13/64 |
| JP | 2013190092 | A | 9/2013 | |
| JP | 3117722 | B2 | 4/2017 | |
| WO | 2014202072 | A1 | 12/2014 | |
| WO | 2018215018 | A1 | 11/2018 | |

* cited by examiner

CLUTCH DISK COMPRISING A PENDULAR ROCKING DAMPER HAVING ONLY ONE DIRECTION OF MOVEMENT BETWEEN THE FLANGE REGIONS THEREOF, AND FRICTION CLUTCH

CROSS-REFERENCE TO RELATED APPLICATIONS

This application is the United States National Phase of PCT Appln. No. PCT/DE2019/100205 filed Mar. 7, 2019, which claims priority to German Application No. DE102018108142.1 filed Apr. 6, 2018, the entire disclosures of which are incorporated by reference herein.

TECHNICAL FIELD

The disclosure relates to a clutch disc for a friction clutch of a motor vehicle, such as of a passenger car, lorry, bus or other commercial vehicle, with an input part which is rotatable about an axis of rotation and has a friction lining, an output part which is also arranged rotatably about the axis of rotation (e.g., further connected to a hub) and a vibration damper coupling the input part to the output part. The vibration damper consists of two parts which are rotatable relative to one another about the axis of rotation within a limited angular range, including flange areas which interact with the input part and the output part, and a plurality of intermediate parts which are each mounted in a pendular manner on a first flange area and a second flange area by means of a slide device. The slide devices are designed such that, when the first flange area is rotated relative to the second flange area, the intermediate parts are each inhibited in their movement (relative to the flange areas) by a spring device. The disclosure also relates to a friction clutch with said clutch disc.

BACKGROUND

Generic clutch discs are already sufficiently well-known from the state of the art. DE 10 2015 211 899 A1, for example, discloses a torsional vibration damper which can be used in a clutch disc and consists of an input part, an output part and a spring device.

In the case of the embodiments known from the state of the art, however, it has turned out to be a disadvantage that the slide devices used here are often relatively large and expensive to manufacture. Especially when moving multi-dimensional slide tracks, i.e. slide tracks with several curve sections running at an angle to each other, in the respective carriage, the flange areas and/or the intermediate parts need to be sufficiently large. With a relatively large swivel angle of the intermediate parts/flange areas and a relatively large spring path of the spring device, this effect is even greater.

In addition, the forces that arise on the slide devices (if rollers are provided in the slide device, the forces acting on the implemented roller contacts) require a certain sufficiently large dimensioning of the components of the slide device (e.g. a certain diameter of the rollers) in order to achieve tolerable pressures. It is therefore also necessary to make openings of considerable size in the corresponding components (along the roller tracks). This is disadvantageous both for the dimensioning of the components and for the entire assembly with regard to the installation space.

In addition, it is known that the implemented embodiments, by implementing several curve sections running transversely to each other, often cause torque properties that are inconsistent. As a result, a jerky and abrupt motion and thus a relatively high component load acts on the components of the slide device during operation.

SUMMARY

The disclosure provides a clutch disc with a vibration damper which on the one hand is compact and on the other applies a smooth load to its components during operation.

According to the disclosure, the slide devices are designed and each flange area is operatively connected to the input part and the output part in such a way that both flange areas are moved relative to each other in a single/common fixed direction of movement, both when the direction of action of a resultant load acting on the input part changes from a first direction of rotation to a second direction of rotation opposite to the first direction of rotation and when the direction of action changes from the second direction of rotation to the first direction of rotation.

This causes the flange areas to move relative to each other along a straight path. The components of the vibration damper can therefore be manufactured at lower expense. For example, only straight slide tracks are required in the respective slide device. This reduces the load on the individual components of the vibration damper during operation. Jerky/abrupt load increases on the components are thus avoided. As a result, the individual components can be accordingly smaller dimensioned and installation space can be saved, or the entire clutch disc can be designed with higher performance.

With regard to the connection of the vibration damper, the first flange area can be rotated (to a limited extent) over a first angular range relative to the input part and/or the output part. Consequently, the second flange section can be rotated over a second angular range relative to the input and/or output part. This makes the interface between the vibration damper and the respective input part as well as the output part easier to manufacture. In this context, the first angular range and the second angular range may be the same size.

In addition, the first flange area may have a first stop which is matched to the input part (i.e. interacts with a (first) counter stop of the input part) in such a way that when the input part rotates in the first direction of rotation, the input part rests against this first stop (the first flange area) for rotation therewith, and when the input part rotates in the second direction of rotation, the input part can be rotated/spaced (to a limited extent) relative to the first flange area.

The second flange area may have a first stop which is matched to the input part (i.e. interacts with a (second) counter stop of the input part opposite the first counter stop) in such a way that, when the input part rotates in the second direction of rotation, the input part rests non-rotatably against this first stop (the first flange area) for rotation therewith, and when the input part rotates in the first direction of rotation, the input part can be rotated/spaced apart relative to the second flange area (to a limited extent). This makes it easier to establish the coupling of the flange areas with the input part.

Thus, for reception on the output part, the first flange area may have a second stop, which is matched to the output part (i.e. interacts with a (first) counter stop of the output part), such that when the output part rotates in the first direction of rotation, the output part rests against this second stop for rotation therewith, and when the output part rotates in the second direction of rotation, the output part can be rotated/spaced relative to the first flange area (to a limited extent).

The second flange area may have a second stop which is matched to the output part (i.e. interacts with a (second) counter stop of the output part which is opposite to the first counter stop) in such a way that when the output part rotates in the second direction of rotation, the output part rests against this second stop for rotation therewith, and when the output part rotates in the first direction of rotation, the output part can be rotated relative to the second flange area (to a limited extent).

Thus, a (first) stop may be attached to both the first flange area and to the second flange area in such a way that the output part and the input part are in contact with the respective flange area during rotation in the first direction of rotation. A (second) stop may also be fitted to both the first and second flange areas in such a way that the output part and the input part are in contact with the respective flange area during rotation in the second direction of rotation.

If the spring device has a variable spring stiffness along its spring path, a multi-stage torque characteristic of the vibration damper can be implemented.

The spring device may consist of a spring unit with several spring elements, e.g., arranged parallel to each other, which act between the intermediate parts.

Each intermediate part may be coupled to the first flange area by means of a first straight slide track and to the second flange area by means of a second straight slide track, which runs at an angle to the first slide track.

In addition, the disclosure relates to a friction clutch for the drive train of a motor vehicle with the disclosed clutch disc, which is used as a first clutch component according to at least one of the previously described embodiments, and a second clutch component which can be connected to the clutch disc by frictional force.

In other words, in accordance with the disclosure, a clutch disc with an oscillation damper is thus implemented in which the input and output flange (first flange area and second flange area) are moved towards each other in only one direction even if the load direction is changed. Only a (straight) section of the previous path curves is required.

BRIEF DESCRIPTION OF THE DRAWINGS

In the following, the disclosure is now explained in more detail with reference to figures. In the figures:

FIG. 5 is a top view of an intermediate part inserted in FIG. 4, and FIG. 6a and FIG. 6b are two diagrams, of which

The figures are only schematic in nature and serve only for understanding the disclosure. The same elements are provided with the same reference symbols.

DETAILED DESCRIPTION

Figure 4:
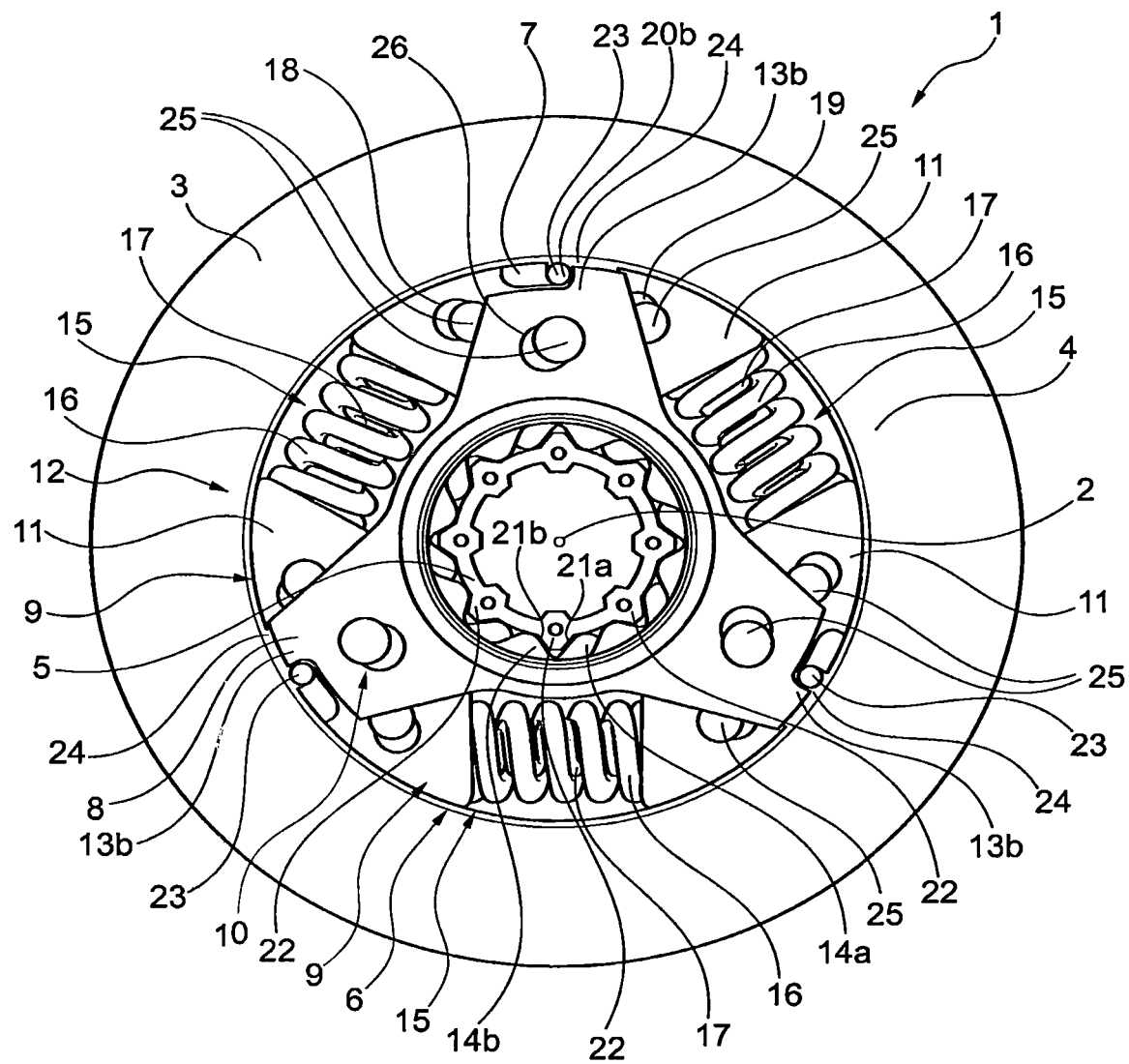
FIG. 4 is a front view of a clutch disc of an example embodiment according to the disclosure, wherein along the circumference of the clutch disc there are a total of three intermediate parts according to the working relationship with the flange areas shown in FIGS. 1 to 3.

First of all, reference is made to FIG. 4, which shows the basic structure of a clutch disc 1 in accordance with the disclosure. Clutch disc 1 typically has a circular/disc-shaped input part 4, which is therefore also called a friction ring. The input part 4 is arranged to rotate around a central axis of rotation 2. A friction lining 3 is arranged on the input part 4, e.g., on both axial sides of the input part 4 (in relation to the axis of rotation 2). The clutch disc 1 in operation is used in a friction clutch, which is not shown here for the sake of clarity. The friction lining 3 then interacts in a typical way with a pressure plate and/or counter plate/pressure element of the friction clutch.

During operation, the clutch disc 1 with its output part 5 may be connected for conjoint rotation to a transmission shaft of a gearbox of a motor vehicle drive train and thus forms a first clutch component of the friction clutch. A second clutch component, which in a closed position of the friction clutch is connected for conjoint rotation to the first clutch component by means of a frictional connection and in an open position of the friction clutch is freely rotatable relative to the first clutch component, once again has the pressure plate and/or the pressure element.

Figure 2:
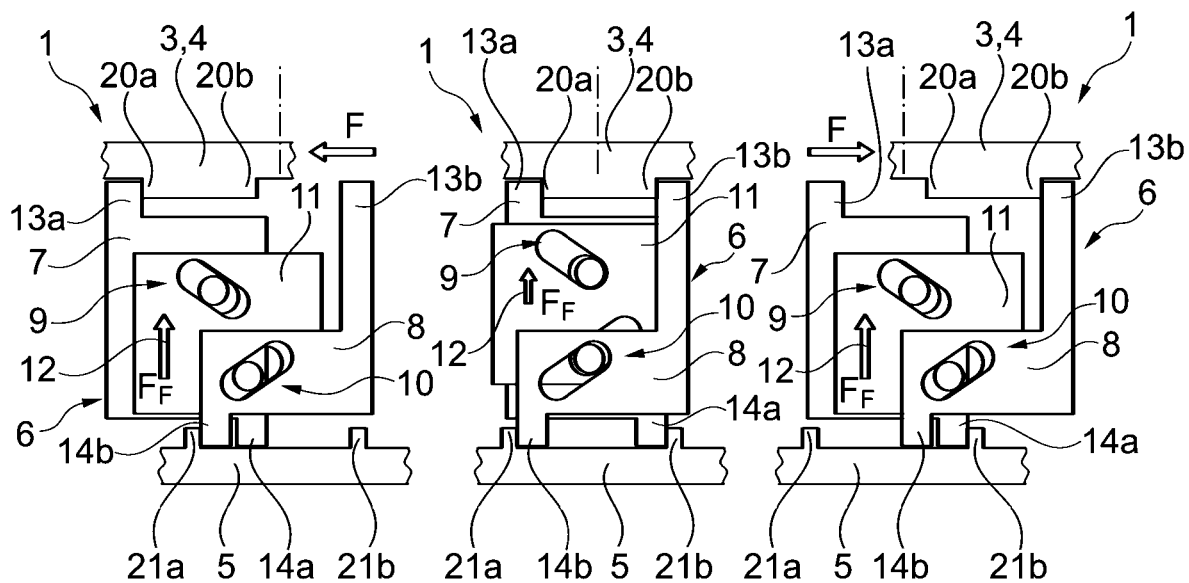
FIG. 2 shows schematic representations of the clutch disc according to FIG. 1, wherein in the central partial representation the vibration damper is arranged in a central position, as already shown in FIG. 1, in the left partial representation the input part is rotated in a first direction of rotation relative to the output part and in the right partial representation the input part is rotated in a second direction of rotation relative to the output part.
Figure 3:
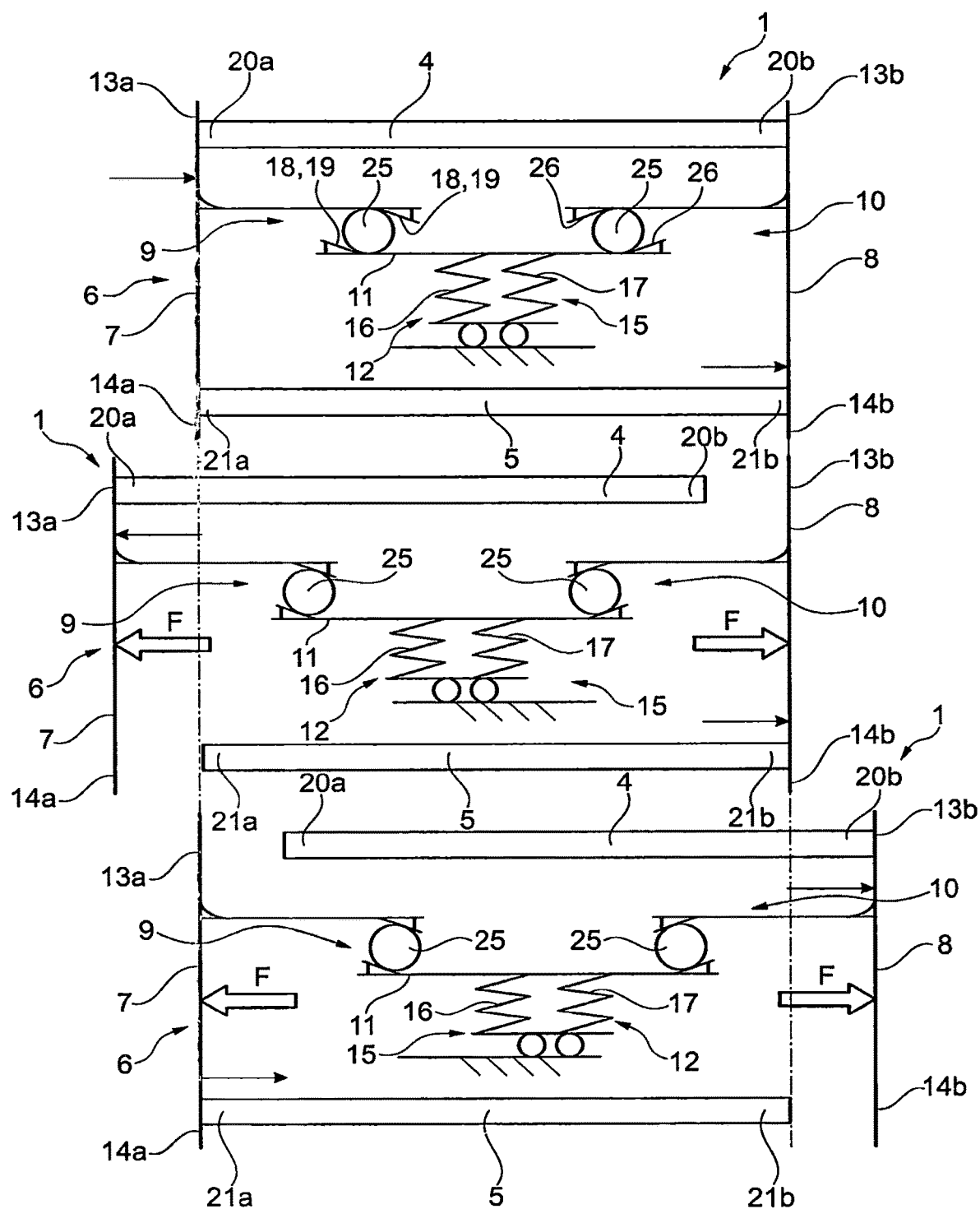
FIG. 3 shows schematic representations of the clutch disc according to FIG. 1, wherein now spring elements of the vibration damper are also shown, and wherein in an upper partial representation the center position of the vibration damper is implemented, in a middle partial representation the input part is rotated in the first direction of rotation relative to the output part and in a lower partial representation the input part is rotated in the second direction of rotation relative to the output part.

The input part 4 has two stop projections 23 at a radially inner area in relation to the axis of rotation 2. The stop projections 23 form a first counter stop 20a and a second counter stop 20b of the input part 4, which can then be seen in greater detail in FIGS. 1 to 3. FIG. 4 shows only one (second) counter stop 20b of input part 4. The counter stops 20a, 20b of the input part 4 are mounted on a lug 24 which protrudes radially inwards from the friction lining 3. The two counter stops 20a, 20b are arranged at a distance from each other in a circumferential direction of the input part 4, i.e. along a circular line running around the axis of rotation 2.

The output part 5 is arranged concentrically to the input part 4. The output part 5 is therefore also arranged rotatably around the axis of rotation 2. The output part 5 is shown as a ring in FIG. 4, and during operation may form a hub directly connected to the gearbox shaft for conjoint rotation. The output part 5 has several projections 22, which project outwards in a radial direction. The projections 22 form a first counter stop 21a and a second counter stop 21b of the output part 5, which can then be seen in greater detail in FIGS. 1 to 3. The counter stops 21a, 21b are arranged spaced apart from each other in the circumferential direction of the output part 5, i.e. along the circular line running around the axis of rotation 2.

The input part 4 is connected/coupled to the output part 5 by means of a vibration damper 6. The vibration damper 6 is typically used for damping torsional vibrations occurring during operation, mainly on the drive side 4. The input part 4 may thus be rotated, but rotation is limited by the embodiment of the vibration damper 6 to a specific (rotational) angular area relative to the output part 5.

Figure 1:
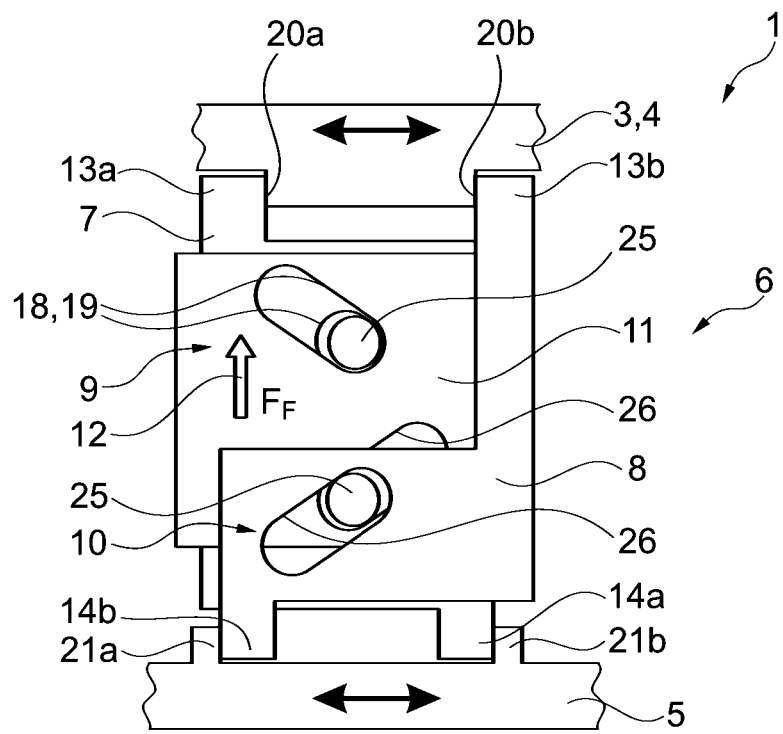
FIG. 1 is a schematic representation of a peripheral region of a clutch disc of the disclosure, implemented according to an example embodiment, wherein a vibration damper of the clutch disc inserted between an input part and an output part is shown on the side of a first flange area, a second flange area and an intermediate part coupling these flange areas.

In this context, reference is first made to FIG. 1. FIG. 1 schematically illustrates the peripheral area of the clutch disc 1 according to FIG. 4 that illustrates an intermediate part 11 between a first flange area 7 and a second flange area 8. The flange areas 7 and 8 are designed separately from the input and output parts 4, 5 and thus each forms a single flange part. Input part 4 is shown schematically, with the counter stops 20a, 20b pointing in opposite directions in the circumferential direction. The output part 5 with its two counter stops 21a, 21b, which point in opposite directions in the circumferential direction, is also schematically shown.

In the vibration damper 6, the two flange areas 7, 8 and several intermediate parts 11 are distributed in the circumferential direction. The respective intermediate part 11 is coupled to the first flange area 7 via a first slide device 9 and to the second flange area 8 via a second slide device 10. The intermediate part 11 is therefore arranged in such a way that it can be moved relative to the first flange area 7 via the first sliding device 9 and relative to the second flange area 8 via the second sliding device 10.

The first slide device 9 has several first slide tracks 18, which interact with each other via a roller element 25 which is displaceably mounted in them. One first slide track 18 is formed directly in the intermediate part 11, while another first slide track 18 is formed directly in the first flange area 7. A roller element 25 is inserted into the two first slide tracks 18 and thus serves for coupling/motion coupling of the first flange area 7 with the intermediate part 11 along the roller track of the roller elements 25 defined by the first slide tracks 18.

Figure 5:
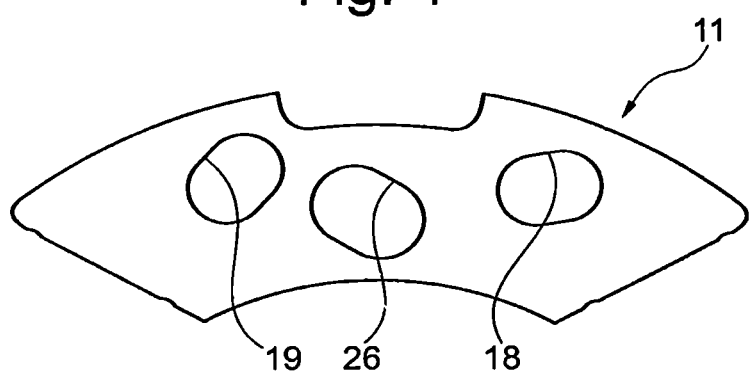

The first slide device 9 also has several second slide tracks 19, which interact with each other via a roller element 25 which is displaceably mounted in them. One second slide track 19 is formed directly in the intermediate part 11, while another second slide track 19 is formed directly in the first flange area 7. A roller element 25 is used in the two second slide tracks 19 and thus serves to couple the movement of the first flange area 7 with the intermediate part 11 along the roller track of the roller elements 25 defined by the second slide tracks 19. The second slide track 19 in the intermediate section 11 runs at an angle to the first slide track 18, as shown in FIG. 5.

Similarly, the intermediate part 11 is motion-coupled to the second flange area 8 via the second slide device 10. The second slide device 10 has two (third) slide tracks 26, one of the third slide tracks 26 being inserted in the intermediate part 11 and another second slide track 26 being inserted in the second flange area 8. A roller element 25 is used in the two third slide tracks 26 and thus serves for motion coupling of the second flange area 8 with the intermediate part 11 along the roller track of the roller elements 25 defined by the third slide tracks 26. The third slide track 26 in the intermediate section 11 runs at an angle to both the first slide track 18 and the second slide track 19 of the intermediate section 11.

All slide tracks 18, 19, 26 run exclusively in a straight line, i.e. they are designed as straight slots. As is evident from FIG. 2, the slide devices 9 and 10 are designed in such a way that when the intermediate part 11 is moved, i.e. with vibrational motion of the intermediate part 11 in the radial direction and in the circumferential direction, the flange areas 7, 8 are pressed apart or pushed together again in the circumferential direction.

The intermediate parts 11 are supported by a spring device 12 during their motion in the radial direction and in the circumferential direction relative to the flange areas 7, 8. The spring device 12 acts on each intermediate part 11. As is once again evident from FIG. 4, the spring device 12, has a spring unit 15 for each intermediate part 11. The spring units 15 are arranged distributed in circumferential direction. A spring unit 15 is arranged between two circumferentially adjacent intermediate parts 11. The spring unit 15 is used directly to support the intermediate parts 11. A first end of spring unit 15 is in contact with an intermediate part 11, a second end of spring unit 15 opposite the first end is in contact with another intermediate part 11.

The spring units 15 are clamped between the intermediate parts 11 in such a way that the intermediate parts 11 are pretensioned radially outwards. If the intermediate parts 11 are moved radially inwards by a relative rotation of the flange areas 7, 8 in relation to each other, the spring units 15 are compressed and thus an increased force is exerted on the intermediate parts 11 in a radial direction outwards. The respective spring unit 15 has a first spring element 16 and a second spring element 17, which is arranged parallel (alternatively in series) to the first spring element 16. The two spring elements 16 and 17 are designed as helical compression springs in this embodiment. The second spring element 17 is located inside the first spring element 16.

According to the disclosure, the slide devices 9, 10 are designed in principle like this and each flange area 7, 8 is in operative connection with the input part 4 and the output part 5 in such a way that both when the direction of action of a resulting load acting on the input part 4 changes from a first direction of rotation (in the first circumferential direction) to a second direction of rotation (second circumferential direction) opposite to the first direction of rotation and when the direction of action changes from the second direction of rotation to the first direction of rotation, the two flange areas 7, 8 are moved relative to each other in a single fixed direction of movement. This can be seen particularly well in the partial representations in FIG. 2.

The first flange section 7 can be rotated over a first angular range relative to the input part 4 and the output part 5. The second flange section 8 can also be rotated over a second angular range relative to the input part 4 and the output part 5.

For this purpose, the first flange section 7 has a first stop 13a, which interacts with the input part 4, namely the first counter stop 20a. The first stop 13a is shaped and the first flange area 7 is in principle designed in such a way that the input part 4, when rotating in the first direction of rotation (relative to the output part 5), lies against this first stop 13a for conjoint rotation and thus also rotates the first flange area 7. This can be seen in the left part of FIG. 2. At the same time, the first stop 13a and the first flange area 7 are designed in such a way that, when the input part 4 is rotated in the second direction of rotation (relative to the output part 5), i.e. opposite to the first direction of rotation, the input part 4 rotates freely relative to the first flange area 7 in the fixed (first) angular range. During this movement in the second direction of rotation, the input part 4 is in contact with a first stop 13b of the second flange area 8 through its second counter stop 20b opposite the first counter stop 20a. This first stop 13b of the second flange area 8 is matched to the input part 4 in such a way that the input part 4 rests against the first stop 13b for conjoint rotation when rotating in the second direction of rotation and can be rotated relative to the first flange area 7 when rotating in the first direction of rotation.

Accordingly, the flange areas 7 and 8 interact with the counter stops 21a, 21b of the output part 5 via their second stops 14a, 14b. The second flange section 8 has a second stop 14a which interacts with the output part 5, namely the first counter stop 21a. The second stop 14a is shaped and the second flange area 8 is In principle designed in such a way that the output part 5 lies against this second stop 14a for conjoint rotation when rotating in the first direction of rotation (relative to the input part 4) and thus also rotates the second flange area 8. This can be seen in the right part of FIG. 2.

At the same time, the second stop 14a and the second flange area 8 are designed in such a way that when the output part 5 rotates in the second direction of rotation (relative to the input part 4), i.e. opposite to the first direction of rotation, the output part 5 rotates freely relative to the second flange area 8 in the fixed (first) angular range. During this movement in the second direction of rotation, the output part 5 is in contact with a second stop 14b of the second flange area 8 via its second counter stop 21b opposite the first counter stop 21a. This second stop 14b of the second flange area 8 is matched to the output part 5 in such a way that the output part 5 rests against the second stop 14b for conjoint rotation during rotation in the second direction of rotation and can be rotated relative to the second flange area 8 during rotation in the first direction of rotation.

Thus the respective first flange area 7 and the second flange area 8 can be rotated in the circumferential direction within a limited angular range relative to the input part 4 and the output part 5. During this relative rotation, the spring device 12 has an inhibiting effect on the movement of the intermediate parts 11 in such a way that a load difference between input part 4 and output part 5 is damped/weakened. The spring device 12 is shown schematically in FIG. 2 as a force arrow marked $F_F$, which acts on the intermediate part 11. The force arrow F applied to the input part 4 shows the resulting load acting on the input part 4 and forcing the input part 4 to rotate relative to the output part 5.

Figure 6A:
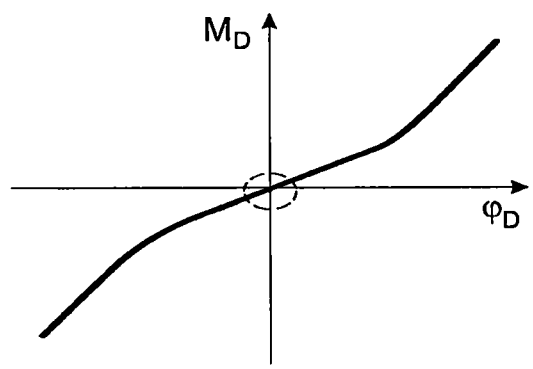
FIG. 6a shows a torque characteristic implemented by the damper of FIGS. 1 to 4 and FIG. 6b shows the implemented path characteristic of the intermediate section in the vibration damper of FIGS. 1 to 4.
Figure 6B:
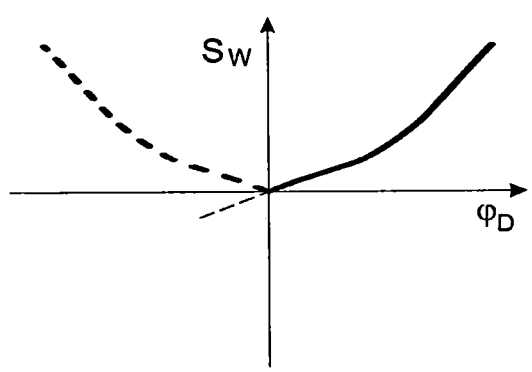

FIG. 6a shows a torque characteristic (course of the torque MD as a function of the torsion angle (angular range) $\varphi_D$) of the vibration damper 6. FIG. 6b shows a path characteristic (course of the displacement $s_W$ as a function of the angle of twist (angular range) $\varphi_D$) of the intermediate part 11 (corresponding to the spring movement).

In other words, the two flange parts (first and second flange areas 7, 8) according to the disclosure are moved relative to each other in only one direction even when the load direction is changed. Therefore, only a (straight) section of the track curves (slide tracks 18, 19, 26) is necessary. One advantage is that the openings (slide tracks 18, 19, 26) in the components (along the curve flanks) can be reduced or that the pivot angle between input and output part 4, 5 can be relatively increased. This is advantageous for the dimensioning of the components or the entire assembly or for the performance parameters of the clutch disc. No transition areas of the path curves 18, 19, 26 are required for the two movement/load directions.

FIG. 5 shows the relatively smaller openings for the curve flanks 18, 19, 26 (space for roller movement) as an example for the intermediate part 11. Another advantage is that the same curve track 18, 19, 26 is also used when changing the load direction. At the otherwise existing transition point there is no discontinuity at the roller-curve contact and thus no jerky or abrupt loads. The torque characteristic therefore also shows a slope at the "transition point". FIG. 4 shows the points of contact of the input part 4 and the output part 5 (to the first flange (first flange area 7) and to the second flange (second flange area 8)). Examples of this include stop pins (stop projection 23) on the input part 4 and serrations (elevations 22) on the output part 5.

REFERENCE NUMERALS

1 Clutch disc
2 Axis of rotation
3 Friction lining
4 Input part
5 Output part
6 Vibration damper
7 First flange area
8 Second flange area
9 First slide device
10 Second slide device
11 Intermediate part
12 Spring device
13a First stop of the first flange area
13b First stop of the second flange area
14a Second stop of the first flange area
14b Second stop of the second flange area
15 Spring unit
16 First spring element
17 Second spring element
18 First slide track
19 Second slide track
20a First counter stop of the input part
20b Second counter stop of the input part
21a First counter stop of the output part
21b Second counter stop of the output part
22 Elevation
23 Stop projection
24 Lug
25 Roller element
26 Third slide track

The invention claimed is:

1. A clutch disc for a friction clutch of a motor vehicle, comprising:
    an input part rotatable about an axis of rotation, comprising a friction lining;
    an output part rotatable about the axis of rotation; and
    a vibration damper which coupling the input part to the output part, comprising:
        a first part with a first flange area that interacts with the input part and the output part;
        a second part with a second flange area that interacts with the input part and the output part, and is rotatable relative to the first part about the axis of rotation with a limited angular range;
        a spring device;
        a first intermediate part coupled to the first flange area and the second flange area by a first slide device; and
        a second intermediate part coupled to the first flange area and the second flange area by a second slide device such that, when the first flange area is rotated relative to the second flange area, movement of the first intermediate part relative to the second intermediate part is inhibited by the spring device, wherein each of the first flange area and the second flange area is in operative connection with the input part and the output part such that:
            when a direction of action of a resulting load acting on the input part changes from a first rotational direction to a second rotational direction, opposite the first rotational direction, the first flange area is moved relative to the second flange area in a single fixed direction of movement; and when the direction of action acting on the input part changes from the second rotational direction to the first rotational direction, the first flange area is moved relative to the second flange area in the single fixed direction of movement.

2. The clutch disc of claim 1, wherein the first flange area is rotatable over a first angular range relative to the input part or the output part.

3. The clutch disc of claim 2, wherein the second flange area is rotatable over a second angular range relative to the input part or the output part.

4. The clutch disc of claim 1, wherein the first flange area comprises a first stop matched to the input part such that:

the input part lies against the first stop for conjoint rotation with the first flange area when the input part is rotated in the first rotational direction; and the input part is rotatable relative to the first flange area when the input part is rotated in the second rotational direction.

5. The clutch disc of claim 4, wherein the second flange area comprises a second stop matched to the input part such that:

the input part is rotatable relative to the second flange area when the input part is rotated in the first rotational direction; and the input part lies against the second stop for conjoint rotation with the second flange area when the input part is rotated in the second rotational direction.

6. The clutch disc of claim 1, wherein the first flange area comprises a third stop matched to the output part such that:

the output part lies against the third stop for conjoint rotation with the first flange area when the output part rotates in the first rotational direction; and the output part is rotatable relative to the first flange area when the output part rotates in the second rotational direction.

7. The clutch disc of claim 6, wherein the second flange area comprises a fourth stop matched to the output part such that:

the output part is rotatable relative to the second flange area when the output part rotates in the first rotational direction; and the output part lies against the fourth stop for conjoint rotation with the second flange area when the output part rotates in the second rotational direction.

8. The clutch disc of claim 1, wherein the spring device has a variable spring stiffness along its spring path.

9. The clutch disc of claim 1, wherein the spring device comprises a spring unit with a plurality of spring elements acting between the first intermediate part and the second intermediate part.

10. A friction clutch for a motor vehicle drive train, comprising:

the clutch disc of claim 1 used as a first clutch component; and a second clutch component which can be connected to the clutch disc by frictional engagement.

* * * * *